(12) United States Patent
Shetty et al.

(10) Patent No.: US 8,767,567 B1
(45) Date of Patent: Jul. 1, 2014

(54) INTELLIGENT ASSIGNMENT OF WIRELESS COMMUNICATION OVERHEAD MESSAGING RESOURCES

(75) Inventors: Manoj Shetty, Overland Park, KS (US); Sachin R. Vargantwar, Overland Park, KS (US); Deveshkumar Narendrapratap Rai, Overland Park, KS (US); Debasish Sarkar, Irvine, CA (US); Siddharth S. Oroskar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1080 days.

(21) Appl. No.: 12/247,796

(22) Filed: Oct. 8, 2008

(51) Int. Cl.
*H04L 12/26* (2006.01)

(52) U.S. Cl.
USPC ........ 370/252; 370/328; 370/459; 455/452.2; 455/453; 709/226

(58) Field of Classification Search
None
See application file for complete search history.

(56) References Cited

U.S. PATENT DOCUMENTS

| | | | |
|---|---|---|---|
| 6,532,224 B1 * | 3/2003 | Dailey | 370/337 |
| 2004/0160914 A1 | 8/2004 | Sarkar | |
| 2005/0007973 A1 * | 1/2005 | Jang et al. | 370/319 |
| 2005/0250520 A1 | 11/2005 | Johnson et al. | |
| 2006/0030373 A1 * | 2/2006 | Park | 455/574 |
| 2007/0153719 A1 * | 7/2007 | Gopal | 370/328 |
| 2007/0201377 A1 * | 8/2007 | Santhanam | 370/252 |
| 2007/0274343 A1 | 11/2007 | Nishio | |
| 2008/0205327 A1 * | 8/2008 | Tu | 370/328 |
| 2009/0186627 A1 * | 7/2009 | Zhang | 455/453 |

* cited by examiner

*Primary Examiner* — Khoa Huynh

(57) ABSTRACT

A wireless communication system uses a series of repeating overhead time cycles that each comprise a plurality of time slots. The system exchanges overhead information with wireless communication devices during individual time slots. The communication system wirelessly receives a registration request for wireless communication service from a wireless communication device. The communication system processes loading information for the overhead time cycles or a quality of service level of the wireless communication device to assign the wireless communication device to one of the overhead time cycles. The communication system wirelessly indicates the assigned overhead time cycle to the wireless communication device. The communication device monitors the overhead time slots during the assigned one of the overhead time cycles and does not monitor the overhead time slots during the not assigned overhead time cycles.

21 Claims, 5 Drawing Sheets

INTELLIGENT ASSIGNMENT OF WIRELESS COMMUNICATION OVERHEAD MESSAGING RESOURCES

TECHNICAL FIELD

Aspects of the disclosure are related to the field of communications, and in particular, wireless communication protocols of wireless communication networks.

TECHNICAL BACKGROUND

Wireless communication networks typically include wireless communication devices which, via a wireless communication system, communicate with further communication networks and equipment. The wireless communication system typically includes access nodes and associated equipment to route communications over wireless links from the wireless communication devices to further communication networks, equipment, and destinations.

When wireless communication devices desire to initiate communication services with the wireless communication system, a registration process typically occurs. This registration process can include the wireless communication devices monitoring beacons or pilot signals of access nodes in the wireless communication system. Also, as a part of this registration process, the wireless communication devices are configured to receive overhead information via a randomly assigned overhead messaging cycle carried over control channels in each of the wireless links. However, when many wireless communication devices attempt to register with the same access node, overcrowding and poor performance can result.

Overview

What is disclosed is a method of operating a wireless communication system, where a series of repeating overhead time cycles each comprise a plurality of time slots, and where the wireless communication system exchanges overhead information with wireless communication devices during individual ones of the time slots. The method includes wirelessly receiving a registration request for wireless communication service from one of the wireless communication devices. The method also includes, in response to the registration request, processing loading information for the overhead time cycles to assign the wireless communication device to one of the overhead time cycles, and wirelessly indicating the assigned one of the overhead time cycles to the wireless communication device, where the wireless communication device monitors the overhead time slots during the assigned one of the overhead time cycles and does not monitor the overhead time slots during the not assigned overhead time cycles.

What is disclosed is a method of operating a wireless communication system, where a series of repeating overhead time cycles each comprise a plurality of time slots, and where the wireless communication system exchanges overhead information with wireless communication devices during individual ones of the time slots. The method includes wirelessly receiving a registration request for wireless communication service from one of the wireless communication devices. The method also includes, in response to the registration request, processing a quality of service level of the wireless communication device to assign the wireless communication device to one of the overhead time cycles, and wirelessly indicating the assigned one of the overhead time cycles to the wireless communication device, where the wireless communication device monitors the overhead time slots during the assigned one of the overhead time cycles and does not monitor the overhead time slots during the not assigned overhead time cycles.

What is also disclosed is a communication system. The communication system includes a wireless communication system configured to exchange overhead information with wireless communication devices during individual ones of a plurality of time slots of a series of repeating overhead time cycles. The wireless communication system is also configured to wirelessly receive a registration request for wireless communication service from one of the wireless communication devices, and, in response to the registration request, process loading information for the overhead time cycles to assign the wireless communication device to one of the overhead time cycles. The wireless communication system is also configured to wirelessly indicate the assigned one of the overhead time cycles to the wireless communication device. The wireless communication device is configured to monitor the overhead time slots during the assigned one of the overhead time cycles and not monitor the overhead time slots during the not assigned overhead time cycles.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
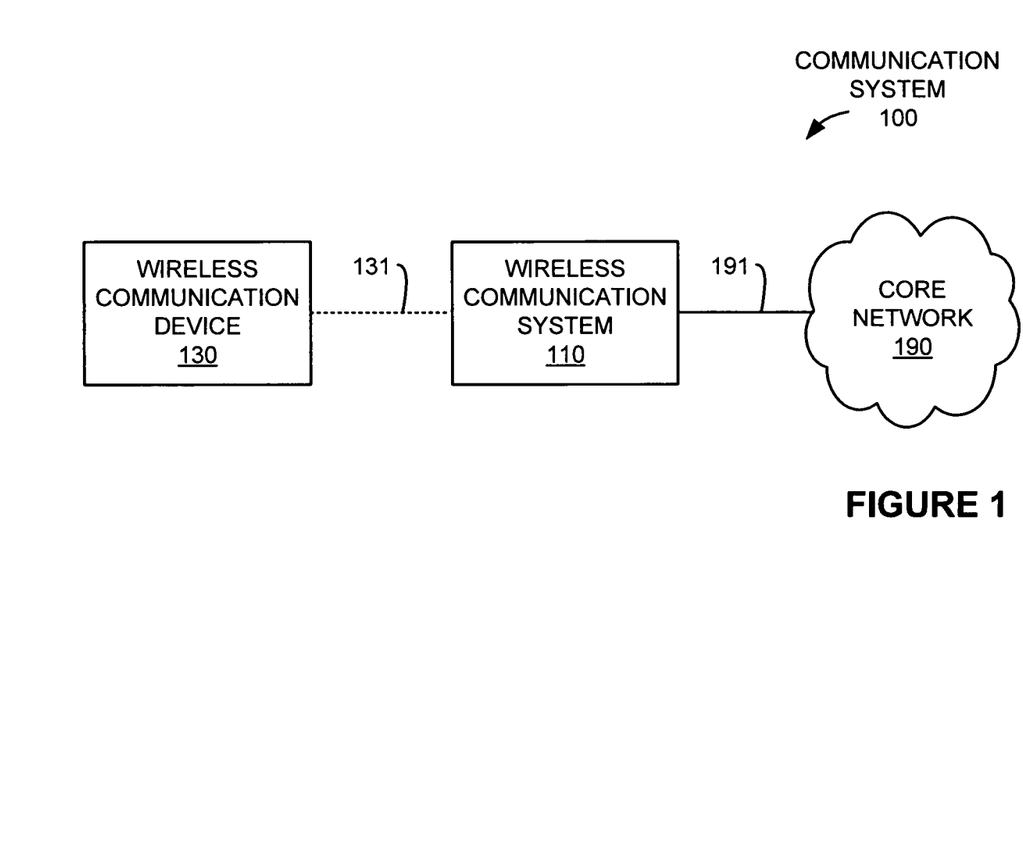
FIG. 1 is a system diagram illustrating a communication system.

FIG. 1 is a system diagram illustrating communication system 100. Communication system 100 includes wireless communication device 130, wireless communication system 110, and core network 190. Wireless communication device 130 and wireless communication system 110 communicate over wireless link 131. Core network 190 and wireless communication system 110 communicate over link 191.

Wireless communication device 130 comprises a telephone, transceiver, computer, digital assistant, smart phone, Internet appliance, or some other wireless communication apparatus—including combinations thereof. Although communication system 100, as shown in FIG. 1, includes one wireless communication device, it should be understood that in other examples, more wireless communication devices could be in communication with wireless communication system 110.

Wireless communication system 110 includes wireless communications network equipment capable of communicating with wireless communication device 130. Examples of wireless communication system 110 can include base stations, base transceiver stations, boomer stations, antennas, radio node controllers (RNC), mobile switching centers, call processing equipment, wireless access nodes, wireless access points, telephone switches, Internet routers, network gateways, as well as other type of communication equipment—including combinations thereof.

Core network 190 could include an Internet network, wireless network, telephony network, optical network, enterprise network, local area network, packet data serving node, or (PDSN), or some other type of communication network or communication equipment—including combinations thereof.

Wireless link 131 uses various communication media, such as air, space, or some other wireless transport media—including combinations thereof. Wireless link 131 could use protocols such as code division multiple access (CDMA), evolution-data optimized (EV-DO), worldwide interoperability for microwave access (WiMAX), long-term evolution (LTE), wireless fidelity (WiFi), global system for mobile communications (GSM), universal mobile telecommunications system (UMTS), or some other communication format—including combinations, variations, or improvements thereof.

Wireless link 131 may comprise many different signals sharing the same link. Wireless link 131 could include multiple signals operating in a single "airpath"—as represented by the dashed line in FIG. 1—comprising multiple frequencies, timeslots, time cycles, channels, directional links, transportation ports, logical transportation links, network sockets, packets, or communication directions. For example, communications and control signals between wireless communication device 130 and wireless communication system 110 could share the same wireless link 131, but be transferred over different frequencies, timeslots, time cycles, channels, directional links, transportation ports, logical transportation links, network sockets, packets, or in different directions—including combinations thereof.

Link 191 uses various communication media, such as air, space, metal, optical fiber, or some other signal propagation path—including combinations thereof. Link 191 could be wired or wireless and could use communication protocols such as Internet, Internet protocol (IP), local-area network (LAN), optical networking, hybrid fiber coax (HFC), telephony, T1, or some other communication format—including combinations, improvements, or variations thereof. Link 191 could be a direct link or might include various equipment, intermediate components, systems, and networks. Link 191 could include multiple signals operating in a single pathway in a similar manner as wireless link 131.

Figure 2:
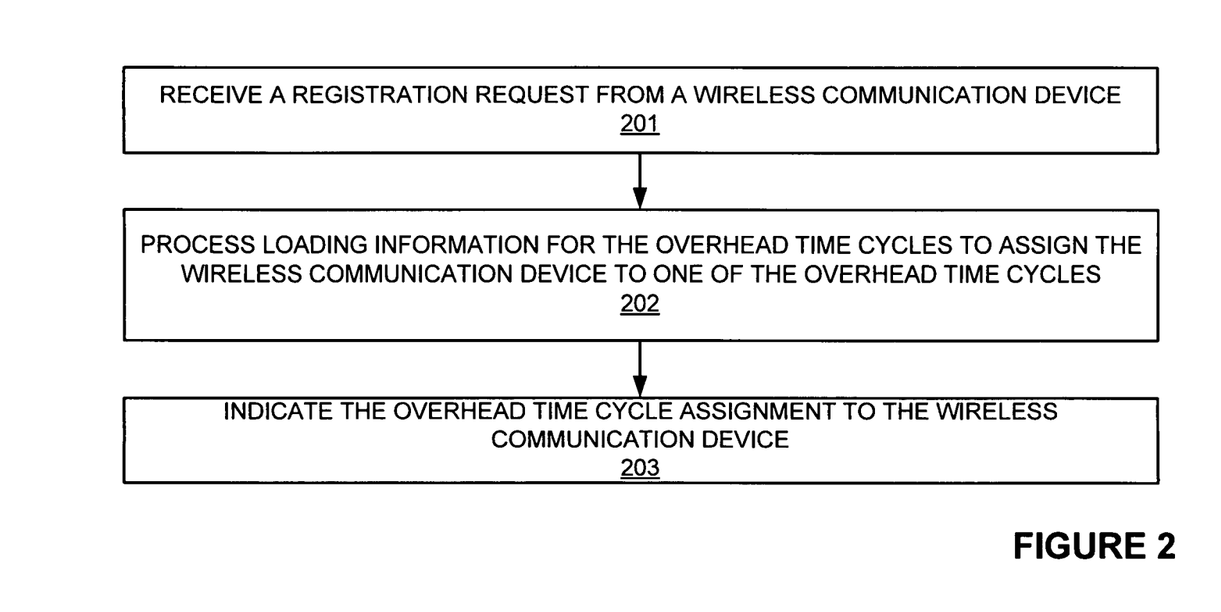
FIG. 2 is a flow diagram illustrating a method of operation of a communication system.

FIG. 2 is a flow diagram that illustrates a method of operation of communication system 100, as found in FIG. 1. The phases shown in FIG. 2 are indicated herein parenthetically. In FIG. 2, wireless communication system 110 receives (201) a registration request from wireless communication device 130 as part of a registration process for wireless communication service. The registration request could include, in some examples, a request to initiate a communication session by wireless communication device 130 with wireless communication system 110. Other examples of the registration request include a request by wireless communication device 130 for access to wireless communication system 110.

The registration process varies based upon the particular wireless communication protocol employed. In example protocols such as CDMA or EV-DO, wireless communication device 130 monitors a pilot channel portion of wireless link 131. Wireless communication device 130 then could receive registration information such as a spreading code, serial number, unicast access terminal identifier (UATI), communication session identifier, or other identifier, among other registration information. After the registration process has completed, user communications can be exchanged between wireless communication device 130 and wireless communication system 110.

In a typical example of communication system 100, in addition to user communications, wireless communication system 110 is configured to exchange overhead information with wireless communication device 130 throughout the communication services, user communications, sessions, or time of access by wireless communication device 130. In some examples, this overhead information is exchanged in individual overhead messaging time slots of a series of repeating overhead time cycles, where each overhead time cycle includes many overhead messaging time slots. In many examples, the repeating overhead time cycles are a part of an overhead communication channel between wireless communication system 110 and wireless communication device 130. This overhead communication channel could further be a part of wireless link 131, which could include many different communication channels, such as forward links and reverse links, between wireless communication system 110 and wireless communication device 130.

In an example EV-DO protocol, the repeating overhead time cycles could be control cycles of a control channel of the EV-DO forward link from wireless communication system 110 to wireless communication device 130. Further examples of the overhead communication is discussed below and illustrated in FIG. 5.

Wireless communication system 110 processes (202) loading information for the overhead time cycles to assign wireless communication device 130 to one of the overhead time cycles. The loading information could include, for example, a number of other wireless communication devices sharing each overhead time cycle, an amount of overhead information being transferred in each overhead time cycle, or other information indicating a loading status of the overhead time cycles. In some examples, the processing of the loading information occurs during the registration process, while in other examples, subsequent determinations of overhead time cycle assignment could occur after registration has occurred due to changing loading information as monitored during user communications between wireless communication device 130 and wireless communication system 110.

Wireless communication system 110 then indicates (203) the overhead time cycle assignment to wireless communication device 130. In many examples, the indication occurs over wireless link 131. Since, in typical examples, the overhead information is transferred repeatedly in a finite series of repeating overhead time cycles, wireless communication device 130 could be assigned to monitor the overhead messaging time slots of one of the overhead time cycles and not monitor the overhead messaging time slots of the unassigned overhead time cycles.

Advantageously, by intelligently assigning the limited resources of overhead messaging in wireless protocols, such as overhead time cycles, to wireless communication device 130 based on loading of the various overhead time cycles in wireless communication system 110, a more balanced distribution can be achieved in the various overhead time cycles and associated time slots among wireless communication device 130 and other wireless communication devices in communication with wireless communication system 110. Overloaded overhead time cycles can lead to latency in transferring overhead messages to wireless communication devices as well as a decrease in throughput of overhead messages leading to delays in receiving user communications, messages, or even telephone calls that cannot be connected. Advantageously, a communication system configured as described herein can thus provide higher quality of service and better performance than randomly assigning or hashing wireless communication devices to overhead time cycles.

In addition to the loading of the overhead time cycles, other factors could also be considered. These factors could include, for example, a quality of service level of the wireless communication devices, a service-level agreement (SLA), the application type of the user communications, data traffic patterns, a user type of the wireless communication devices, or other factors, including combinations thereof.

In further examples, the overhead time cycles could be partitioned or reserved for specific uses, applications, or user types. For example, an emergency services user type, such as fire fighters, could be assigned to a specific overhead time cycle reserved for emergency services purposes. Advantageously, partitioning such emergency services from other user types could provide a higher priority or higher level of service. In other examples, the application type of the user communications could be considered. For example, an application type of voice calls could be configured to receive overhead information during a certain overhead time cycle which provides a high level of service, whereas an application type of Internet traffic could be configured to receive overhead information during a certain overhead time cycle which provides a different level of service.

An application type comprises a user service or user communications as implemented in communications transferred between wireless communication device 130 and wireless communication system 110. The user services, for example, could include Internet communications, voice calls, telephony, video, audio, email, text, chat data, web pages, peer-to-peer (P2P) communications, Voice over IP (VoIP), as well as other data and application types—including combinations thereof. The application could also be distinguished among different application service providers, even though such application service providers are providing similar types of user services. For example, although Voice over IP (VoIP) is a type of user service, various application service providers, could also be distinguished from each other, much like the individual user services.

Figure 3:
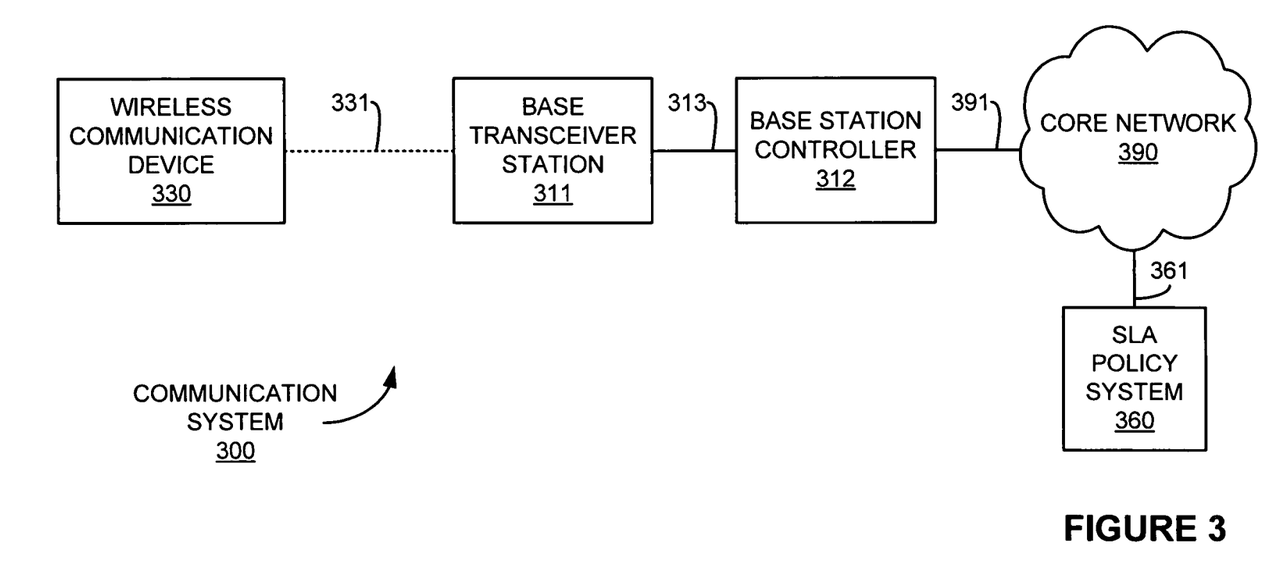
FIG. 3 is a system diagram illustrating a communication system.

FIG. 3 is a system diagram illustrating communication system 300. Communication system 300 includes wireless communication device 330, base transceiver station 311, base station controller 312, core network 390, and service-level agreement (SLA) policy system 360. Wireless communication device 330 and base transceiver station 311 communicate over wireless link 331. Base transceiver station 311 and base station controller 312 communicate over link 313. Base station controller 312 and core network communicate over link 391. Core network 390 and SLA policy system 360 communicate over link 361.

Communication system 300 could also include other equipment and elements, for example, radio node controllers (RNC), mobile switching centers (MSC), call processing systems, authentication, authorization and accounting (AAA) equipment, as well as other equipment—including combinations thereof.

Wireless communication device 330 comprises smart phone in this example. Although communication system 300, as shown in FIG. 3, includes one wireless communication device, it should be understood that in other examples, more wireless communication devices could be in communication with base transceiver station 311.

Base transceiver station 311 comprises base transceiver station equipment in this example, and further includes an antenna and antenna tower. Base station controller 312 is configured to monitor and control the operations of base transceiver station 311—in this example, base transceiver station 311 is operated by the same service provider as base station controller 312. Core network 390 includes a core network of the service provider in this example, comprising an Internet network, local area networks, and other telecommunications equipment and networks. Links 313 and 361 each comprise T1 connections, and link 391 comprises an optical networking connection in this example. Wireless link 331 comprises a wireless link operating within the EV-DO protocol in this example.

SLA policy system 360 comprises a computer system or special purpose circuitry which may include a storage system, database, user service profile directory, or some other type of directory or listing—including combinations thereof. SLA policy system 360 could be located within core network 390, or located remotely from core network 390.

Figure 4:
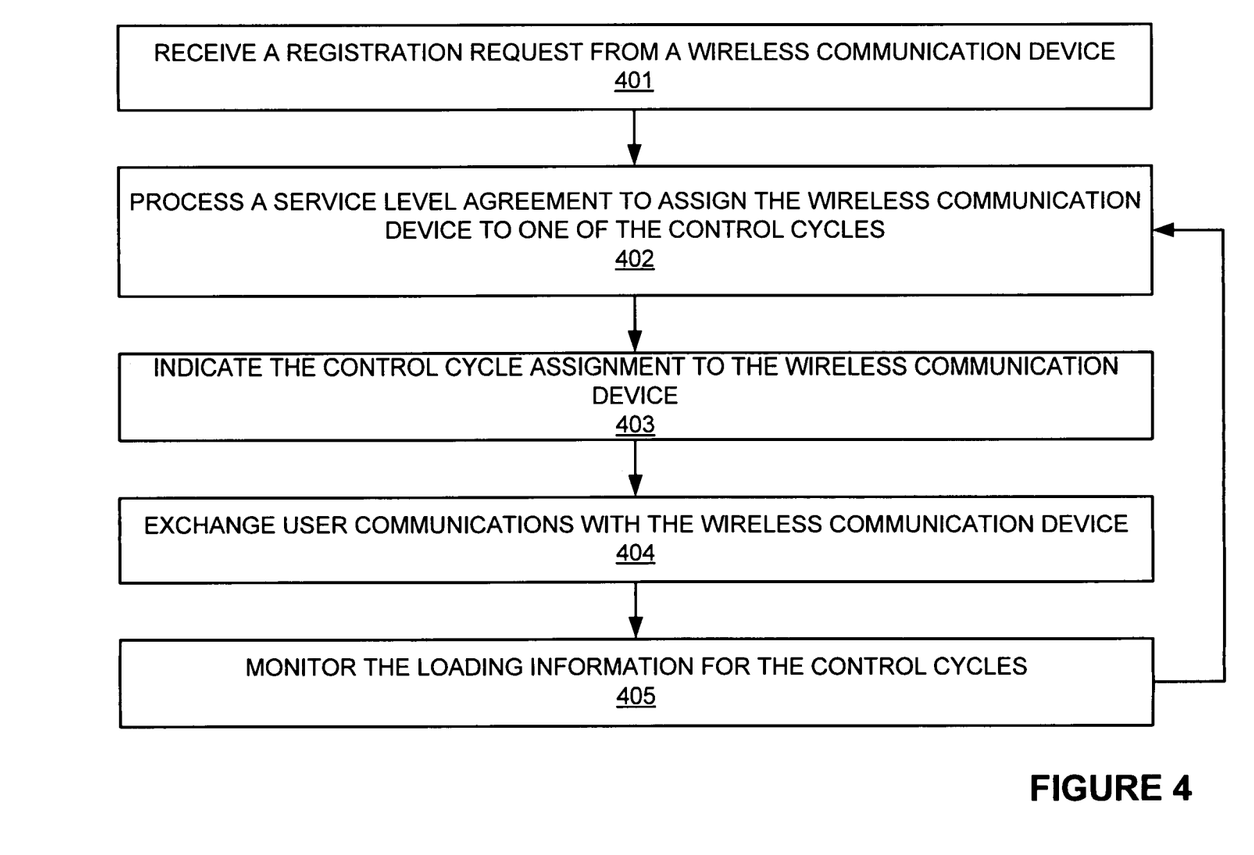
FIG. 4 is a flow diagram illustrating a method of operation of a communication system.

FIG. 4 is a flow diagram that illustrates a method of operation of communication system 300, as found in FIG. 3. The phases shown in FIG. 4 are indicated herein parenthetically. In FIG. 4, base transceiver station 311 receives (401) a registration request from wireless communication device 330 as part of a registration process for wireless communication service.

The registration request includes a request to initiate a user communication session by wireless communication device 330 with base transceiver station 311. Base transceiver station 311 communicates this request to base station controller 312 over link 313. Wireless communication device 330 monitors a pilot channel portion of wireless link 331. Wireless communication device 330 then receives registration information such as a spreading code and unicast access terminal identifier (UATI), among other registration information from base station controller 312 through base transceiver station 311. Further equipment and systems in core network 390 could be involved in the registration process. After the registration process has completed, user communications can be exchanged between wireless communication device 330 and core network 390 through base transceiver station 311 over wireless link 331.

In addition to user communications, base transceiver station 311 is configured to exchange overhead information with wireless communication device 330 throughout the user communication session period. In this example, this overhead information is exchanged in individual overhead messaging time slots of a series of 12 repeating control cycles, where each control cycle includes 256 overhead messaging time slots, although different amounts of control cycles or overhead messaging time slots are possible. Also in this example, the control cycles are a part of a control channel between base transceiver station 311 and wireless communication device 330. This control channel is further part of a forward link of wireless link 331. Further examples of the overhead communication is discussed below and illustrated in FIG. 5.

Base station controller 312 processes (402) a service level agreement (SLA) of wireless communication device 330 to assign wireless communication device 330 to one of the control cycles. In some examples, the processing of the service level agreement occurs during the registration process, while in other examples, subsequent determinations of control cycle assignment could occur after registration has occurred due to changing loading information as monitored during user communications between wireless communication device 330 and base transceiver station 311, changing application type of the user communications, or other changes.

The SLA indicates a level of service provided to wireless communication device 330. The level of service given to the user communications and control cycle assignment can vary on the communication medium, the application type, the level of service purchased by a user, the user type, or other factors. Also, the level of service could vary based upon application type. For example, streaming video could receive a lower level of service than voice calls, and e-mail could receive a lower level of service than streaming video. In some cases, no distinction is made between the wireless communication device and the user of the wireless communication device, whereas in other cases, a distinction could be made.

Base station controller 312, through base transceiver station 311, then indicates (403) the control cycle assignment to wireless communication device 330 over wireless link 331. Since the overhead information is transferred repeatedly in a finite series of 12 repeating control cycles, wireless communication device 330 would monitor the overhead messaging time slots of the assigned control cycles and would not monitor the overhead messaging time slots of the unassigned control cycles.

User communications are then exchanged (404) between wireless communication device 330 and base transceiver station 311 over wireless link 331. The user communications could be exchanged over a different portion of the forward link of wireless link 331, or likewise a reverse link portion of wireless link 331. Base transceiver station 311 could further exchange the user communications with base station controller 312, core network 390, among other systems and equipment.

Base station controller 312 monitors (405) loading information for the control cycles during the exchange of user communications. The loading information could include, for example, a number of other wireless communication devices sharing each control cycle, an amount of overhead information being transferred in each control cycle, or other information indicating a loading status of the control cycles. As shown in FIG. 4 by the flow line feeding back to phase 402, the loading information could then be considered along with the service level agreement to reassign wireless communication device 330 to another control cycle. This determination could occur after registration has occurred due to changing loading information as monitored during user communications between wireless communication device 330 and base transceiver station 311.

Figure 5:
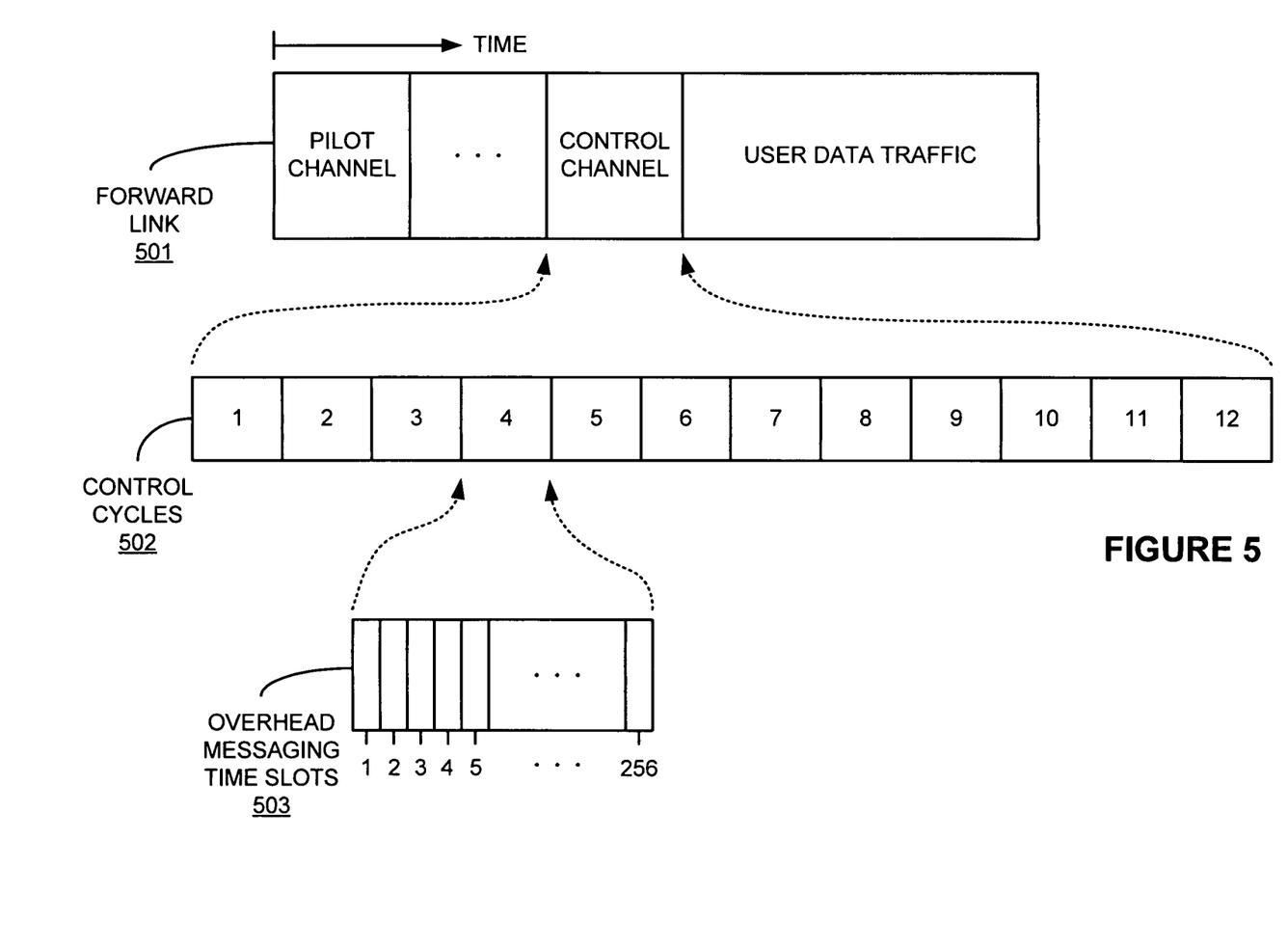
FIG. 5 is a diagram illustrating a forward link in a wireless communication system.

FIG. 5 is a diagram illustrating an example of a forward link in wireless link 331, as found in FIG. 3, although wireless link 331 could use other configurations. FIG. 5 illustrates forward link 501, control cycles 502, and overhead messaging time slots 503.

Forward link 501 includes several time-wise portions, with time increasing to the right, as shown by the arrowhead above forward link 501. In forward link 501, a pilot channel, control channel, and user data traffic portion are shown, although additional portions could also be in forward link 501. The forward link sequence is typically repeated continuously to effectuate communication service from base transceiver station 311 to wireless communication device 330 over wireless link 331. In further examples, a reverse link of wireless link 331 could exist to facilitate communication service from wireless communication device 330 to base transceiver station 311. Other examples of forward link 501 could include frequency-wise portions, or other configurations, including combinations thereof.

The pilot channel includes information related to base transceiver station 311 and the service provider of communication system 300 used in the registration process of wireless communication device 330. The user data traffic portion includes user communications, such as voice call data, web pages, email, among other information. The control channel includes information related to overhead information of wireless link 331 and overhead information of the associated communication services. The control channel could comprise broadcast portions applicable to all wireless communication devices in communication with base transceiver station 311, and portions specific to wireless communication device 330 or other wireless communication devices. In some examples, this overhead information includes quick configuration messages, access parameters, sector parameters, paging, text messages, among other information.

In the example shown in FIG. 5, control cycles 502 includes 12 control cycles. Each of the control cycles are distinct, with possibly different content, in the control channel of forward link 501. Also, included in each control cycle 1-12 are overhead messaging time slots 503. In this example, 256 time slots are included in each control cycle 1-12. Each overhead messaging time slot 1-256 includes overhead information.

Since, as described herein, a wireless communication device will be assigned to a particular control cycle, only the time slots within the assigned control cycle will be monitored by the wireless communication device. Additionally, the individual time slots 1-256 for each control cycle 1-12 could also have information which allows a wireless communication device to determine if the time slot is relevant to the particular wireless communication device. In some cases, some time slots will be broadcast information applicable to many wireless communication devices, while in other cases, some time slots will be intended for a specific wireless communication device. The overhead messaging information as described herein will, in typical examples, be found within the individual time slots.

FIGS. 1-5 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication system, wherein a series of repeating overhead control cycles of a control channel of a wireless link provided by a wireless access node each comprise a plurality of time slots, and wherein the wireless communication system exchanges overhead information with wireless communication devices over the control channel during individual ones of the time slots, the method comprising:

in the wireless access node, wirelessly receiving a registration request for wireless communication service from one of the wireless communication devices;

in response to the registration request, processing loading information for the overhead control cycles of the control channel indicating at least a quantity of the wireless communication devices already assigned to each of the overhead control cycles of the control channel to identify one of the overhead control cycles of the control channel to assign the one of the wireless communication devices;

assigning the one of the wireless communication devices to the one of the overhead control cycles of the control channel of the wireless link provided by the wireless access node; and wirelessly indicating the assigned one of the overhead control cycles of the control channel to the one of the wireless communication devices, wherein the one of the wireless communication devices monitors the time slots during the assigned one of the overhead control cycles of the control channel and does not monitor the time slots during the not assigned overhead control cycles of the control channel.

2. The method of operating the wireless communication system of claim 1, further comprising:

exchanging user communications with the one of the wireless communication device;

monitoring the loading information for the overhead control cycles;

processing the loading information for the overhead control cycles to assign the one of the wireless communication devices to another one of the overhead control cycles;

wirelessly indicating the other assigned one of the overhead control cycles to the one of the wireless communication devices.

3. The method of operating the wireless communication system of claim 1, further comprising:

in response to the registration request, processing a quality of service level of the one of the wireless communication devices to assign the one of the wireless communication devices to one of the overhead control cycles.

4. The method of operating the wireless communication system of claim 1, further comprising:

in response to the registration request, processing a service level agreement of the one of the wireless communication devices to assign the one of the wireless communication devices to one of the overhead control cycles.

5. The method of operating the wireless communication system of claim 1, further comprising:

in response to the registration request, processing a user type of the one of the wireless communication devices to assign the one of the wireless communication devices to a predetermined one of the overhead control cycles.

6. The method of operating the wireless communication system of claim 5, wherein the user type is an emergency services user type, and the predetermined one of the overhead control cycles is a reserved overhead control cycle for emergency services.

7. The method of operating the wireless communication system of claim 1, further comprising:

in response to the registration request, processing an application type of the one of the wireless communication devices to assign the one of the wireless communication devices to one of the overhead control cycles.

8. The method of operating the wireless communication system of claim 7, further comprising:

exchanging user communications of the application type with the one of the wireless communication device;

monitoring the application type of the user communications and the loading information for the overhead control cycles;

processing the loading information for the overhead control cycles and the application type of the user communications to assign the one of the wireless communication devices to another one of the overhead control cycles;

wirelessly indicating the other assigned one of the overhead control cycles to the one of the wireless communication devices.

9. The method of operating the wireless communication system of claim 1, wherein the overhead control cycles are control cycles within a control channel of an evolution data optimized (EV-DO) forward wireless link.

10. The method of operating the wireless communication system of claim 1, wherein the overhead information is at least quick configuration messages, access parameter messages, and sector parameter messages of control cycles within a control channel of an evolution data optimized (EV-DO) forward wireless link.

11. A method of operating a wireless communication system, wherein a series of repeating overhead control cycles of a control channel of a wireless link provided by a wireless access node each comprise a plurality of time slots, and wherein the wireless communication system exchanges overhead information with wireless communication devices over the control channel during individual ones of the time slots, the method comprising:

in the wireless access node, wirelessly receiving a registration request for wireless communication service from one of the wireless communication devices;

in response to the registration request, processing loading information of the overhead control cycles of the control channel indicating at least a quantity of the wireless communication devices already assigned to each of the overhead control cycles of the control channel and processing a quality of service level of the one of the wireless communication devices to identify one of the overhead control cycles of the control channel to assign the one of the wireless communication devices;

assigning the one of the wireless communication devices to one of the overhead control cycles of the control channel of the wireless link provided by the wireless access node; and wirelessly indicating the assigned one of the overhead control cycles of the control channel to the one of the wireless communication devices, wherein the one of the wireless communication devices monitors the time slots during the assigned one of the overhead control cycles of the control channel and does not monitor the time slots during the not assigned overhead control cycles of the control channel.

12. The method of operating the wireless communication system of claim 11, further comprising:

exchanging user communications with the one of the wireless communication device;

monitoring the loading information for the overhead control cycles;

processing the loading information for the overhead control cycles and the quality of service level of the one of the wireless communication devices to assign the one of the wireless communication devices to another one of the overhead control cycles;

wirelessly indicating the other assigned one of the overhead control cycles to the one of the wireless communication devices.

13. The method of operating the wireless communication system of claim 11, further comprising:

in response to the registration request, processing a service level agreement of the one of the wireless communication devices to assign the one of the wireless communication devices to one of the overhead control cycles.

14. The method of operating the wireless communication system of claim 11, further comprising:
in response to the registration request, processing a user type of the one of the wireless communication devices to assign the one of the wireless communication devices to a predetermined one of the overhead control cycles.

15. The method of operating the wireless communication system of claim 14, wherein the user type is an emergency services user type, and the predetermined one of the overhead control cycles is a reserved overhead control cycle for emergency services.

16. The method of operating the wireless communication system of claim 11, further comprising:
in response to the registration request, processing an application type of the one of the wireless communication devices to assign the one of the wireless communication devices to one of the overhead control cycles.

17. The method of operating the wireless communication system of claim 16, further comprising:
exchanging user communications of the application type with the one of the wireless communication device;
monitoring the application type of the user communications;
processing the application type of the user communications and the quality of service level of the one of the wireless communication devices to assign the one of the wireless communication devices to another one of the overhead control cycles;
wirelessly indicating the other assigned one of the overhead control cycles to the one of the wireless communication devices.

18. The method of operating the wireless communication system of claim 11, wherein the overhead control cycles are control cycles within a control channel of an evolution data optimized (EV-DO) forward wireless link.

19. The method of operating the wireless communication system of claim 11, wherein the overhead information is at least quick configuration messages, access parameter messages, and sector parameter messages of control cycles within a control channel of an evolution data optimized (EV-DO) forward wireless link.

20. A communication system, comprising:
a wireless communication system configured to exchange overhead information with wireless communication devices during individual ones of a plurality of time slots of a series of repeating overhead control cycles of a control channel of a wireless link provided by a wireless access node;
the wireless access node configured to wirelessly receive a registration request for wireless communication service from one of the wireless communication devices;
the wireless communication system configured to, in response to the registration request, process loading information for the overhead control cycles of the control channel indicating at least a quantity of the wireless communication devices already assigned to each of the overhead control cycles of the control channel to identify one of the overhead control cycles of the control channel to assign the one of the wireless communication devices;
the wireless communication system configured to assign the one of the wireless communication devices to the one of the overhead control cycles of the control channel of the wireless link provided by the wireless access node; and
the wireless communication system configured to wirelessly indicate the assigned one of the overhead control cycles of the control channel to the one of the wireless communication devices;
the one of the wireless communication devices configured to monitor the time slots during the assigned one of the overhead control cycles of the control channel and not monitor the time slots during the not assigned overhead control cycles of the control channel.

21. The communication system of claim 20, comprising:
the wireless communication system configured to, in response to the registration request, process a quality of service level of the one of the wireless communication devices to assign the one of the wireless communication devices to one of the overhead control cycles.

\* \* \* \* \*